United States Patent [19]

Cook et al.

[11] Patent Number: 5,708,098

[45] Date of Patent: Jan. 13, 1998

[54] METHOD OF PREPARING SOLVENTLESS, THERMOPLASTIC SILICONE PELLETS AND THE PELLETS SO-PRODUCED

[75] Inventors: Leon Neal Cook; Richard Allen Hessick, Jr.; Kevin Edward Lupton; David Joseph Romenesko; Randall Gene Schmidt; Hongxi Zhang, all of Midland, Mich.

[73] Assignee: Dow Corning Corporation, Midland, Mich.

[21] Appl. No.: 705,106

[22] Filed: Aug. 28, 1996

[51] Int. Cl.⁶ .................................................. C08F 283/00

[52] U.S. Cl. ........................ 525/477; 525/478; 525/479; 525/476

[58] Field of Search .................................. 525/477, 478, 525/479, 476

[56] References Cited

U.S. PATENT DOCUMENTS

| | | |
|---|---|---|
| 2,676,182 | 9/1954 | Daudt et al. .................. 260/448.2 |
| 4,935,484 | 6/1990 | Wolfgruber et al. ................ 528/34 |
| 5,324,806 | 6/1994 | Wengrovius et al. ............... 528/10 |

*Primary Examiner*—Margaret W. Glass
*Attorney, Agent, or Firm*—Arne J. Jarnholm

[57] ABSTRACT

Solventless, thermoplastic silicone pellets are prepared blending silicone resins (A) of the MQ-type and with predominantly linear silicone fluids (B), such as polydimethylsiloxane liquids and gums, to substantially homogeneity. The blends are heated to a predetermined compression-forming temperature, compression-formed to a densified mass and shaped into a pellet form. The composition of the pellets is balanced such that the pellets exhibit plastic flow at the predetermined compression-forming temperature and resist agglomeration at temperatures at or below a predetermined maximum storage temperature.

22 Claims, 1 Drawing Sheet

METHOD OF PREPARING SOLVENTLESS, THERMOPLASTIC SILICONE PELLETS AND THE PELLETS SO-PRODUCED

BACKGROUND OF THE INVENTION

1. Field of the Invention

The present invention relates generally to a novel method of making solventless silicones and more particularly to a method of preparing such silicones in pellet form.

2. Description of the Prior Art

Description of the prior art and the present invention requires that the definition of certain terms be understood.

As used herein, the term "silicone fluid" describes a linear silicone polymer, for example polydimethylsiloxane. The term "fluid" is used in this sense even if the linear polymer contains a minor amount of branched chains or if, at room temperature, the material appears as more of a gum or solid. In other words, the term "fluid" describes only the predominantly linear characteristics of the polymer. It will be understood that silicone fluids may also include reactive or functional groups.

Silicone fluids, then, can be defined as being of the general formula:

wherein x and y are positive numerical values and z is 0 or a positive numerical value with the provisos that $x+y+z=1$, $y/(x+y+z) \geq 0.8$ and R' is a functional or nonfunctional, substituted or unsubstituted organic radical.

As used herein, the term "resin" describes a silicone composition wherein the molecular structure is arranged in a predominantly three dimensional network. Thus, the term silicone "resin" is used to distinguish the composition from silicone fluids.

The silicone resins utilized in the present invention are frequently designated "MQ" resins. MQ resins are macromolecular polymers comprised primarily of $R_3SiO_{1/2}$ and $SiO_{4/2}$ units (the M and Q units, respectively) wherein R is a functional or nonfunctional, substituted or unsubstituted organic radical. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units. Such resins are frequently produced by the method disclosed in U.S. Pat. No. 2,676,182, Daudt et al., which is incorporated herein by reference.

MQ silicone resins are generally produced in such a manner that the resin macromolecules are dissolved in a solvent, which is typically, but not always, an aromatic solvent. Thus, as used herein, the term "solventless" means that substantially all the liquid solvent has been removed from the "solid" resin phase.

It is known in the art to produce solventless forms of silicone resins.

In U.S. Pat. No. 4,935,484 to Wolfgruber et al., there is disclosed a method for obtaining silicone resin powders by spray-drying aqueous colloidal suspensions of organopolysiloxanes. The process utilizes resins prepared from alkoxysilanes, or the partial hydrolyzate thereof and an emulsifier. The hydrolytically-formed alkanol is distilled off and the resultant suspension spray-dried. Organopolysiloxanes, which are free of alkoxy groups and which have a maximum of eight siloxane units per molecule, may also be employed, provided that they are mixed with at least one alkoxy silane or a partial hydrolyzate thereof.

U.S. Pat. No. 5,324,806 to Wengrovius et al. discloses another method of making a solventless silicone resin which is described as a free-flowing powder. In the method of Wengrovius et al. an organosiloxane hydrolyzate is dispersed into an organic solvent and thereafter spray-dried.

The solventless powder form of resins produced by the teachings of Wolfgruber et al. and Wengrovius et al. has several drawbacks. Because the powders generally have low bulk density they are expensive to store and ship. Powders are also inconvenient to handle and convey in manufacturing processes. Finally, powders do not exhibit thermoplastic behavior and hence are difficult to disperse when formulating blends with other products, such as organic thermoplastics and silicone rubbers.

Thus, it would be highly desirable to provide a method of preparing solventless silicone resins wherein the resins produced therefrom: 1) exhibit thermoplastic behavior; 2) have a high bulk density; and 3) are easily handled at temperatures below a predetermined maximum storage temperature.

BRIEF DESCRIPTION OF THE INVENTION

In accordance with the present invention, there is provided a method of preparing solventless silicone compositions in pellet form. The pellets have a high bulk density, as compared to spray-dried silicone powders, and are easily handled and transported at temperatures below a predetermined maximum storage temperature. Because the pellets exhibit thermoplastic behavior, the siloxane composition of the pellets may be readily incorporated into formulated blends with other products, such as organic thermoplastics and silicone rubber bases.

The novel method of preparing solventless silicone compositions in pellet form comprises the steps of:

(I) blending:

(A) an organosilicone resin of the empirical formula ..

wherein: a and d are positive numerical values and b and c are zero or positive numerical values with the provisos that $a+b+c+d=1$, $0 \leq (b+c) \leq 0.2$; and R is a monovolent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl;

said organosilicone resin (A) having a number average molecular weight (Mn) between about 2,000 and about 15,000; and (B) a predominantly linear silicone fluid having the empirical formula wherein: x and y are positive numerical values and z is 0 or a positive numerical value with the provisos that $x+y+z=1$, $y/(x+y+z) \geq 0.8$; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl;

said predominantly linear silicone fluid having a degree of polymerization greater than about 10;

said blending step (I) being carried out to form a substantially homogenous mixture of components (A) and (B);

(II) heating the substantially homogeneous mixture of components (A) and (B) to a predetermined compression-forming temperature;

(III) compression-forming said heated mixture of components (A) and (B) at said compression-forming temperature to form a densified mass therefrom;

(IV) shaping said densified mass into the form of a pellet; and (V) cooling said densified mass to a temperature less than said predetermined maximum storage temperature;

said organosilicone resin (A) and said predominantly linear silicone fluid (B) being present in relative amounts such that: said substantially homogeneous mixture of components (A) and (B) has a complex viscosity ($\eta$) less than $10^8$ centipoise at said predetermined compression-forming temperature; and said pellets have a dynamic shear modulus (G*), measured at a frequency of 10 radians/sec, of at least $5\times10^7$ dyne/cm$^2$ at temperatures less than said predetermined maximum storage temperature.

In most instances, the maximum predetermined storage temperature is that encountered under ambient conditions. Thus, the maximum predetermined storage temperature may differ for differing conditions and climates but will generally be in the range of 0° C. to about 50° C. It is therefore one object of the invention to provide a readily usable form of silicone compositions in pellet form, which pellets do not agglomerate at typical storage and handling temperatures.

The predetermined compression-forming temperature is that temperature at which the compression-forming step (III) is carried out and is always a higher temperature than the predetermined storage temperature. For a given ratio of resin (A):fluid (B), the predetermined compression-forming temperature is selected such that the blend can undergo flow and form a densified mass. The present inventors have found that a densified mass will not be produced unless the complex viscosity ($\eta$*) of the resin (A)/fluid (B) is less than about $10^8$ centipoise. In other words, the silicone composition in pellet form must exhibit sufficient thermoplastic behavior at the predetermined compression-forming temperature to flow and form a densified mass.

It is therefore an object of the present invention to provide silicone compositions in the form of a solventless pellet, having a high bulk density.

It is another object of the present invention to provide solventless silicone pellets that exhibit thermoplastic behavior.

Still another object of the present invention is to provide solventless silicone compositions in pellet form, which pellets are easily handled at temperatures below a predetermined maximum storage temperature.

These and other objects and features of the present, invention will become apparent to those skilled in the art from the following Drawings and Detailed Description of the Invention, including examples thereof.

DESCRIPTION OF THE DRAWINGS

FIG. 2 is a plan view of the schematic representation of the extrusion apparatus shown in FIG. 1. FIG. 2 is also a cross-sectional view, normal to that illustrated in FIG. 1 and taken along the longitudinal-axis of the housing of the apparatus.

DETAILED DESCRIPTION OF THE INVENTION

In accordance with the present invention, there is provided a method of making silicone compositions in pellet form. The pellets of the invention do not agglomerate at temperatures less than a predetermined maximum storage temperature and have a high bulk density. Thus, they are in a convenient form for handling and conveying during manufacturing operations. The pellets of the invention also exhibit thermoplastic behavior, which permits them to be readily dispersed into other thermoplastic materials, such as polyolefins, polyesters, polyamines and polyamides. The expedient use of silicone pellets in this manner is described in detail in copending U.S. patent application Ser. No. 08/704,061, filed of even date herewith and entitled METHOD OF DISPERSING SILICONE COMPOSITIONS IN ORGANIC THERMOPLASTIC MATERIALS. The entire aforementioned patent application is incorporated herein by reference for such teaching.

As used herein, the term "pellet" means a particle having an effective diameter of at least 800 micrometers. Thus, for purposes of the present invention, particles having an effective diameter less than about 800 micrometers are considered powders. Although pellets need not be spherical in shape, the aforementioned minimum effective diameter translates to a minimum volume of about $2.7\times10^{-4}$ cm$^3$.

The first step (I) of the invention comprises blending an organosilicone resin (A) with a predominantly linear silicone fluid (B) to form a substantially homogeneous mixture thereof. The organosilicone resin (A) has the empirical formula:

$$(R_3SiO_{1/2})_a(R_2SiO_{2/2})_b(RSiO_{3/2})_c(SiO_{4/2})_d$$

wherein: a and d are positive numerical values and b and c are zero or positive numerical values with the provisos that a+b+c+d=1, 0≦(b+c)≦0.2; and R is a monovalent radical independently Selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl. The aforementioned values assigned to a, b, c and d define the "MQ" nature of the resins used to practice the present invention and distinguish them from silsesquioxane-type resins.

The organosilicone resin (A) has a number average molecular weight (Mn) between about 2,000 and about 15,000, and most preferably between about 3,000 and 7,000.

As previously mentioned, the organosilicone resins employed in the present invention are of the MQ-type and are generally prepared in a solution of an organic solvent. When Mn (as determined by resin-calibrated gel permeation chromatography) is less than about 2,000 the resins retain the characteristics of a liquid, regardless of whether or not they are removed from solution. When Mn is less than about 3,000, the pellets of the invention often retain a fair amount of tackiness at ambient temperatures. When Mn is greater than about 7,000 it becomes difficult to blend the resins with the predominantly linear silicone fluids to a substantially homogeneous state, although such resins can still be used to form the pellets of the invention. When Mn is greater than about 15,000, the resins begin to lose their solubility in most solvents and tend to include significant amounts of gel.

The predominantly linear silicone fluids used in the present invention have the empirical formula $$(R'_3SiO_{1/2})_x(R'_2SiO_{2/2})_y(R'SiO_{3/2})_z$$

wherein: x and y are positive numerical values and z is 0 or a positive numerical value with the provisos that $x+y+z=1$, $y/(x+y+z) \geq 0.8$; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl. The above limitations with respect to x, y and z define the predominantly linear nature of the fluid (B).

The predominantly linear silicone fluid (B) has a degree of polymerization greater than about 10. Silicone fluids having a degree of polymerization less than about 10 are generally too volatile and tend to be lost during the heating step (II) of the method of the invention. More preferred are silicone fluids having a degree of polymerization of about 100 and more. Those skilled in the art will appreciate that degree of polymerization of the fluid (B) as well as the amount thereof in the resin (A)/fluid blend will. influence the value of the dynamic shear modulus G* and complex viscosity η* of the blend at any given temperature.

Predominantly linear silicone fluids (B) are commercially available from most silicone suppliers. For instance, Dow Corning® 3-0065, Dow Corning 200® Fluid (350 and 60,000 centistoke versions) and Dow Corning® SGM 3 gum are all suitable types of predominantly linear silicone fluids (B) and are commercially available from the Dow Corning Corporation of Midland, Mich. Another suitable dimethylhydroxy-terminated fluid is Dow Corning Q3-5016, also available from Dow Corning Corporation, Midland, Mich.

Both the silicone resin (A) and the predominantly linear fluid (B) have monovalent organic radicals associated therewith, R and R', respectively. In accordance with the invention, it is stipulated that at least sixty mole percent of the R and R' groups are methyl. Unless these provisos are met, obtaining a substantially homogeneous blend between the resin (A) and fluid (B) is very difficult.

The blending step (I) can be carried out in a number of ways.

In one embodiment of the invention, a silicone resin (A) powder may be directly blended with a silicone fluid (B). Obtaining homogeneity may, however, be difficult, especially if carried out at room temperature and if the silicone fluid (A) is of the gum type.

In the preferred embodiment of the invention, the organosilicone resin (A) and predominantly linear fluid (B) are blended in a relatively volatile co-solvent. The use of a relatively volatile cosolvent in the blending (I) step is preferred because it augments mixing of components (A) and (B) to substantial homogeneity. The co-solvent is thereafter removed by the application of heat and/or a vacuum. Accordingly, the mixture may be recovered in the form of flakes, or a mass that can be broken into flakes. Suitable co-solvents include aromatic organic solvents such as xylene and toluene, which are the preferred solvents in which the MQ resins are often produced. Certain non-aromatic organic solvents such as cyclohexane, heptane, methylene chloride and certain organosilicon solvents such as hexamethyldisiloxane are also suitable co-solvents.

Spray-drying the substantially homogeneous mixture of (A) and (B) from the co-solvent is another viable means of removing the co-solvent to obtain the mixture in the form of a powder. The relative volatility of the co-solvent must be such that it can be removed from the silicone resin (A)/fluid (B) mixture without causing substantial loss of the silicone fluid (B) therefrom.

The aforementioned methods are taught and described in detail in currently co-pending patent application Ser. No. 08/497,736 filed Jul. 3, 1995, entitled METHOD OF PREPARING SOLVENTLESS SILICONE RESINS THAT EXHIBIT SUPERIOR RECONSTITUTION AND THE RESINS SO-PRODUCED, which pending application is incorporated herein by reference in its entirety for such teaching.

The blending step (I) may be carried out simultaneously with the heating (II) and compression-forming (III) steps, in a continuous-feed manner. For instance, independent streams of organosilicone resin (A), in powder form, and a predominantly linear silicone fluid (B) can be simultaneously fed into a screw feed mechanism in an extrusion apparatus equipped with means for heating.

The heating step (II) may be carried out with the use of an external heating source, such as an electrical resistance heater. Those skilled in the art will appreciate, .however, that in certain instances, such as when the blending step (I) is carried out in an extruder, the mechanical energy expended in deforamtion can be sufficient to raise the temperature of the resin (A)/fluid (B) blend to the predetermined compression-forming temperature.

Figure 1:
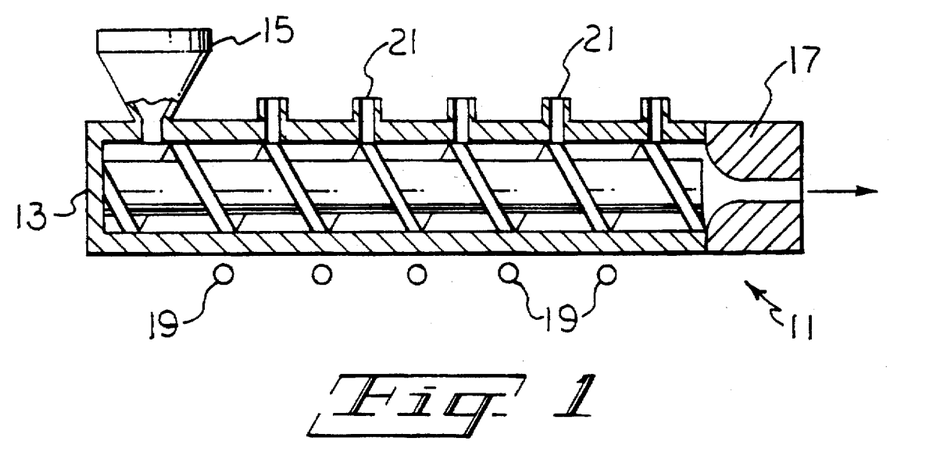
FIG. 1 is a schematic representation of an extrusion apparatus adapted for practicing one embodiment of the method of the invention. The schematic representation is a side elevation shown in cross-section, taken along the longitudinal axis of the housing of the apparatus.
Figure 2:
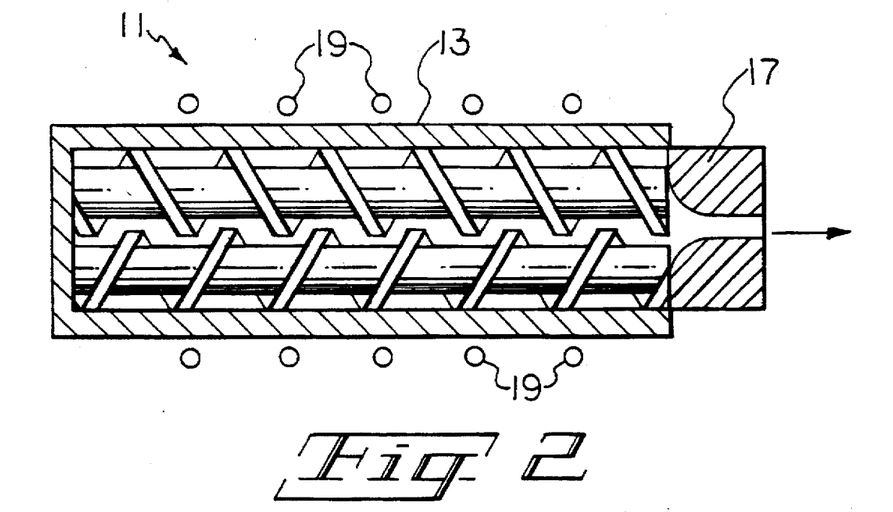

By way of illustration, reference is now made to FIGS. 1 and 2, wherein there is schematically illustrated a twin screw extrusion apparatus, generally indicated by reference numeral 11. The extrusion apparatus 11 includes a housing 13 of a generally elongated shape. The housing 11 is fitted with a material feed port 15, such as a hopper, which is adapted to permit the introduction of organosilicone resin (A) and predominantly linear silicone fluid (B) into the housing 13. The organosilicone resin (A) and predominantly linear silicone fluid (B) may be fed into material feed port 15 as metered, independent streams or in a pre-blended form.

The material feed port 15 is located at one end of the housing 13 and an extrusion die 17, through which the heated and compression-formed blend exits the housing as a densified mass, is located at the other end. The interior of the housing 13 contains a pair of counter-rotating screw-type conveyors 19, which conveyors 19 run the axial length of the housing 13 and move the resin (A) and fluid (B) from the feed port 15 to the die 17. Because the conveyors 19 are counter-rotating, independently introduced streams of organosilicone resin (A) and predominantly linear silicone fluid (B) also undergo blending (I) by their action. As more resin (A) and fluid (B) is introduced through the material feed port 15, pressure builds in the housing 13 adjacent the extrusion die 17 causing the blend to extrude therefrom in the form of a densified mass, thus completing the compression-forming step (III).

The extrusion apparatus 11 also includes a means for heating the blended resin (A) and fluid (B). In FIGS. 1 and 2, the means for heating is schematically illustrated as a plurality of independently-controlled electrical resistance heating elements 19. The independent control associated with heating elements 19 permits the resin (A) and fluid (B) blend to be heated to the predetermined compression-forming temperature at any point in the housing 13 prior to passing through the extrusion die 17.

In most instances, the predetermined storage temperature is ambient temperature. Because the predetermined compression-forming temperature is always greater than the maximum predetermined storage temperature, the cooling step (V) is easily accomplished by simply permitting the densified mass (compression-formed resin (A)/fluid (B) blend) to cool to ambient temperature upon exiting the die 17. Cooling (V) may be augmented by passing the extruded densified stream through a water bath or spray.

The densified mass formed during the compression-forming step can be shaped (IV) into the form of pellets, either before or preferably after the cooling step (V). A reciprocating knife blade (not shown) adjacent the die 17 exit has been found to be particularly useful for shaping (IV) in the form of pellets after the cooling step (III). Alternatively, the densified mass can be shaped into the form of pellets by simply breaking, after cooling.

As mentioned, in the preferred embodiment of the invention, the blending step (I) is carried out utilizing a co-solvent and the co-solvent is then removed. The blending step (I), utilizing a co-solvent, can be followed by the steps of removing the co-solvent, the heating step (II) and the compression-forming step (III), in a continuous fashion utilizing an extrusion apparatus 11 similar to that depicted in the drawings. If the resin (A) is supplied in solution form, the solvent used therein can function as the co-solvent. Minor additions of co-solvent may also be made to augment blending.

FIG. 1 illustrates that in such instances, the housing 13 of the extrusion apparatus 11 may have a plurality of vacuum ports 21 formed therein. A vacuum drawn at the ports 21 allows the solvent to be extracted from the resin (A)/fluid (B) blend during the blending (I) and heating (II) steps.

It is proposed that, in another embodiment of the invention, the compression-forming (III) and shaping (IV) steps could be combined. Such a method would involve practices similar to those in the well-known arts of injection and compression molding thermoplastic materials. A mold, having cavities in a pellet shape, could be used to compression-form the pellets of the invention.

In the pellets of the invention, the organosilicon resin (A) and the predominantly linear silicone fluid (B) are present in relative amounts such that the blend thereof has a complex viscosity ($\eta^*$) of less than $10^8$ centipoise at the predetermined compression-forming temperature. The predetermined compression-forming temperature is typically in the range of about 125° C. to 225° C., although higher and lower temperatures are not excluded from the method of the invention. At the predetermined compression-forming temperature the resin (A)/fluid (B) blend must exhibit thermoplastic behavior, i.e. it must be flowable to the extent that the compression-forming step (III) produces a densified mass. While the complex viscosity is inversely proportional to temperature, the compression-forming step must be maintained at a temperature that is less than that which causes chemical degradation of the resin (A) or fluid (B). That temperature is about 400° C.

The flowable characteristic of the resin (A)/fluid (B) blend at the compression-forming temperature is just opposite the characteristic sought at the predetermined maximum storage temperature. If the pellets exhibit flowable characteristics at the predetermined maximum storage temperature, they tend to agglomerate. Accordingly, the relative amounts of the resin (A) and fluid (B) are balanced such that the dynamic modulus, $G^*$ at the predetermined maximum storage temperature, of the blend, measured at a frequency of 10 radians/sec, is at least $5 \times 10^7$ dynes/cm² at temperatures below the predetermined storage temperature. The present inventors have found that when $G^*$ at the predetermined maximum storage temperature, is in excess of the aforementioned, the pellets tend to resist agglomeration and retain their easy handling characteristics.

On the other hand, in the preferred embodiment of the invention the value of $G^*$ at the predetermined maximum storage temperature, is maintained at a value less than about $10^9$ dynes/cm². When $G^*$ becomes too high, the silicone resin(A)/fluid (B) composition tends to become brittle and the pellets tend to break apart, thereby decreasing their ease of handling because of dust formation.

Thus, in the composition of the pellets of the invention, the relative amounts of resin (A) and fluid (B) are balanced so as to meet both criteria for the predetermined compression-forming temperature and the predetermined maximum storage temperature.

EXAMPLES

In the Examples, an MQ resin was blended with various silicone fluids, in varying proportions, to form blends of various compositions. The blending step (I) was carried out in a xylene solution, after which the solvent was removed by heating at 120° C. under vacuum. All composition blends, except Example No. 5, were then compression-formed by compression-molding. Example No. 5 was compression-formed by extrusion.

Compression-molding was carried out at a temperature of 150° C. under a pressure between 1.5 and 5.0 MPa for 5 minutes, followed by cold-pressing for two minutes. This resulted in compression-formed square slabs approximately 2 mm thick and 10 cm on a side, which were then shaped into pellets by cutting into squares approximately 2 mm–4 mm on a side.

Extrusion was carried out using Haake System-90 rheometer equipped with a TW100 twin-screw extruder. The extruder had intermeshing counter-rotating high intensity mixing screws, about 33 cm in length. Extrusion speed was determined by screw rotation, which was maintained at 100 rpm. The temperature in the extruder housing was maintained at 25° C. near the material feed port and between 100° C. and 140° C. adjacent the extrusion die. The extrusion die itself was maintained at 25° C. The extrudate (i.e. the compression-formed blend of resin (A) and fluid (B)) had a diameter of about 2 mm and was cooled in a water trough upon exiting the die. The cooled extrudate was then cut into pellets about 4 mm long with a reciprocating knife blade.

The dynamic shear modulus, $G^*$, at 25° C. and the complex viscosity, $\eta^*$, at temperatures of 150° C. and 200° C. of the Example compositions were measured on a dynamic mechanical thermal analyzer, model no. RDA-2 having 25 mm parallel plates (available from Rheometrics, Inc. of Piscataway N.J.) Frequency sweeps between 1 radian/second and 100 radians/sec were carried out at each temperature and at strains which insured linear viscoelastic behavior throughout. The values reported below correspond to a frequency of 10 radians per second.

The resin used in the preparation of the samples was 71.5 weight percent solids solution in xylene. Nuclear magnetic resonance ($^{29}$Si) was used to determine the general formula. The general formula included: about 43 mole % M units of $(CH_3)SiO_{1/2}$; about 12 mole % T units of $(OH)SiO_{3/2}$; and about 45 mole % Q units of $SiO_{4/2}$. Resin-calibrated gel permeation chromatography (GPC) revealed that the number average molecular weight, Mn, generally ranged between about 4,600 and 5,000 and the weight average molecular weight, Mw, ranged between 17,000 and 22,000.

The silicone fluids used to produce the pellets of the invention are described below:

FLUID 1 was polydimethylsiloxane having a viscosity of about 50 cSt, which corresponds to a siloxane having a degree of polymerization ("DP") of about 45;

FLUID 2 was polydimethylsiloxane having a viscosity of about 350 cSt, which has a DP of about 135;

FLUID 3 was polydimethylsiloxane having a viscosity of about 60,000 cSt, which has a DP of about 900;

FLUID 4 was a dimethylhydroxy-terminated polydimethylsiloxane having a viscosity of about 60,000 cSt, which has a DP of about 900;

FLUID 5 was a dimethylvinyl-terminated polydimethylsiloxane having a viscosity of about 450 cSt, which corresponds to a DP of about 150; and FLUID 6 was a dimethylvinyl-terminated polydimethylsiloxane gum having a DP of about 9,000 to 10,000.

Table 1, below, sets forth each Example pellet composition (weight % Fluid is reported, balance above resin), the dynamic shear modulus $G^*$ at room temperature and the complex viscosity $\eta^*$ at 150° C. and 200° C. in cps. The viscosity of the above FLUIDS is described in cSt units and the viscosities reported below are in cps units. Those skilled in the art will appreciate that for silicones, there is very little difference in the values of such units. For example, in a polydimethylsiloxane fluid (B), at room temperature, a kinematic viscosity of 100 cSt is equal to an absolute viscosity of 97 cps.

TABLE 1

| Example No. | FLUID No. | Weight % FLUID | $G^*$ dyne/cm$^2$ | $\eta^*$ cps @150° C. | $\eta^*$ cps @200° C. |
|---|---|---|---|---|---|
| 1 | 1 | 25 | $2.15 \times 10^8$ | — | — |
| 2 | 2 | 25 | $2.99 \times 10^8$ | $2.71 \times 10^6$ | $9.59 \times 10^4$ |
| 3 | 3 | 25 | $4.75 \times 10^8$ | — | — |
| 4 | 4 | 25 | $3.20 \times 10^8$ | $3.29 \times 10^6$ | $1.76 \times 10^6$ |
| 5** | 5 | 20 | $9.98 \times 10^8$ | $2.30 \times 10^7$ | $6.91 \times 10^6$ |
| 6 | 5 | 30 | $3.21 \times 10^8$ | $6.39 \times 10^5$ | $6.64 \times 10^4$ |
| 7 | 6 | 40 | $1.06 \times 10^7$ | $5.69 \times 10^3$ | — |
| 8 | 6 | 20 | $8.78 \times 10^8$ | $6.09 \times 10^8$ | $1.45 \times 10^8$ |
| 9 | 6 | 30 | $1.31 \times 10^8$ | $2.65 \times 10^6$ | $8.86 \times 10^6$ |
| 10 | 6 | 40 | $1.39 \times 10^7$ | $5.18 \times 10^6$ | $2.55 \times 10^6$ |
| 11 | 6 | 50 | $8.23 \times 10^5$ | $5.03 \times 10^6$ | $9.42 \times 10^5$ |

**extruded

It should be noted that each of the above. Example compositions exhibited sufficient thermoplastic behavior to permit them to be compression-formed to a densified mass at a low enough compression-forming temperature that degradation of the composition was avoided.

The Example compositions set forth in Table 1 above were then evaluated first for their ability to be readily shaped into a pellet form and then for their storage stability at room temperature. The results of that evaluation are set forth in Table 2, below. While pellet-shaping capability at a given temperature does not define the method or pellets of the present invention, the present inventors have found that when pellet-shaping capability is poor at or near the predetermined maximum storage temperature, storage stability at that temperature is also poor.

As described above, pellet-shaping from slabs was carried out at room temperature and from extrudate after being subjected to a water bath. The pellet-shaping capability of each Example composition was evaluated as either poor, fair or good. Poor pellet-shaping was characterized by a tacky, taffy-like consistency. Fair pellet-shaping capability was characterized by relatively soft compositions but which were nonetheless capable of being formed into discrete pellets. Good pellet-shaping capability was characterized by compositions having a relatively dry feel which were readily shaped into pellet form.

The storage stability of the pellets was evaluated by placing about 200 g of pellets of each Example composition into a glass jar. The jars were then stored for thirty days at room temperature.

The Example compositions were considered to have "excellent" storage stability if, after the thirty day storage, they remained in an unagglomerated condition, retained their dry feel and were easily poured from the jar.

Storage stability was considered "good" if, after the thirty day storage, the pellets were slightly agglomerated but could be easily separated with the aid of a spatula and thereafter poured from the jar. By way of analogy, the behavior of silicone pellets having "good" storage stability may be likened to that of commercially available, bagged ice cubes. When initially removed from the freezer, the ice cubes are often frozen together at numerous points over small areas, such that they seem to have the characteristics of a single mass. If the bag is jarred against a hard surface, the cubes readily break apart and can be poured. therefrom.

An evaluation of "poor" storage stability described pellets which, after storage for thirty days, were so agglomerated that they could not be easily separated with the aid of a spatula and thus, could not be poured from the jar.

TABLE 2

| Example No. | Pellet-Shaping Capability | Storage Stability |
|---|---|---|
| 1 | fair | poor |
| 2 | good | good |
| 3 | good | excellent |
| 4 | good | excellent |
| 5* | good | excellent |
| 6 | fair | poor |
| 7 | poor | — |
| 8 | good | excellent |
| 9 | good | good |
| 10 | fair | poor |
| 11 | poor | — |

*extruded

From the preceding data it can be seen that if the dynamic shear modulus $G^*$ of the resin (A)/fluid (B) blend is less than about $5 \times 10^7$ dyne/cm$^2$ at temperatures at or below the predetermined maximum storage temperature, the composition has such a soft, tacky consistency that it may be difficult to even carry out the step of shaping the densified mass into pellet form at that temperature. Accordingly, storage at that temperature will assuredly result in agglomeration. Example Nos. 7 and 11 illustrate this principle. The extremely low value of complex viscosity $\eta^*$ for these Example compositions (Table 1) is consistent with this result.

Referring now to Example No. 10, it can be seen that while its value of $G^*$ is less than $5 \times 10^7$ dyne/cm$^2$ its pellet-shaping capability was rated as fair. Nonetheless, the storage stability was evaluated as poor. In this Example composition, the fluid (B) had a very high degree of polymerization (9,000 to 10,0000) which, it is believed, contributed to the pellet-shaping capability.

Referring now to Example Nos. 2, 3, 4, 2, 8 and 9, it can be seen that the pellets from each composition had a value of $G^*$ in excess of $5 \times 10^7$ dyne/cm$^2$ and that the storage stability of the pellets ranged from good to excellent. Accordingly, the pellets produced for the compositions of Example Nos. 2, 3, 4, 5, 8 and 9 are considered to be good examples of pellets made in accordance with the invention for a predetermined maximum storage temperature of at least room temperature.

Table 1 shows that the composition of Example No. 5 is identical to that of Example No. 6, except that the ratios of resin (A):fluid (B) in the blends is 80:20 and 70:30, respectively. While the pellets of Example No. 5 had excellent storage stability, the pellets of Example No. 6 were rated poor. Thus, it is clear that the relative amounts of the resin (A) and fluid (B) are determinative of storage stability.

Table 1 shows that the ratio of resin (A):fluid (B) of Example 1 is identical to that of Example No. 4 (at 3:1), yet their storage stabilities were rated poor and excellent, respectively. The difference in the compositions lies in the fact that the degree of polymerization of the fluid (B) used in the composition of Example 1 is 45, while the degree of polymerization of the fluid (B) used in the composition of Example 4 is 900. Each of the Example compositions has a value of G* greater than $5 \times 10^7$ dyne/cm$^2$. Example 1, however, had poor storage stability while Example 4 was evaluated as excellent. Thus, it is clear that for a given ratio of resin (A):fluid (B) in a pellet composition, the fluid (B) must have a minimum degree of polymerization in order for the pellet to have acceptable storage stability.

Because pellets of Example composition Nos. 2, 3, 4, 5, 8 and 9 had storage stability evaluations of good to excellent, the compositions are considered storage stable for thirty days at room temperature. As used herein then, the phrase "storage stable for thirty days" at a given predetermined maximum storage temperature means that the pellets will exhibit good or excellent storage stability, in accordance with the above-stated criteria, when stored at the maximum storage temperature for a period of thirty days.

As previously mentioned, in most instances, the predetermined maximum storage temperature will be ambient temperature and, for that reason, the above Examples have been prepared in accordance therewith. However, those skilled in the art will appreciate that, in certain circumstances it may be desirable to use certain solventless silicone compositions in pellet form wherein pellets made from such compositions are not storage stable at room temperature for thirty days. In such instances, the solventless silicone pellets made in accordance with the invention may be stored under refrigerated conditions until used.

Likewise, because the above Example compositions were made to investigate storage stability at about room temperature, the predetermined compression-forming temperature associated therewith was about 140° C.–150° C. Because the present invention includes pellets having silicone compositions which may require refrigeration for storage stability, it is fully expected that such compositions will have predetermined compression-forming temperatures associated therewith that are considerably below 140° C. and which may even approach room temperature.

Finally, the bulk density of a spay-dried version of the resin used to make the Example compositions, and the pellets from the Example compositions was measured. The bulk densities were measured by respectively weighing the amounts of powder and pellets that would fill a 20 ml glass vial. In each instance, the vial was lightly tapped to remove gross air pockets. The resin, in powder form, had a bulk density of 0.25 g/cm$^3$. By way of comparison, the bulk density of the pellets produced in accordance with the method of the invention, had a bulk density of 0.55 g/cm$^3$. The bulk density of pelletized silicone compositions will, of course, be somewhat but not grossly affected by pellet geometry.

Subsequent experimentation has revealed that the best results, by way of extrusion, were obtained using a Haake System-90 rheometer equipped with a Leiztritz 18 mm twin-screw corotating extruder, having a length to diameter ratio of 40:1. Extrusion speed was determined by raw material addition and screw rotation was maintained at 250 rpm. The extruder housing was equipped with eight independently controlled heating zones. Zones 1–3 were maintained at 50° C. and zones 4, 5, 6, 7 and 8 were maintained at 80° C., 70° C., 65° C., 50° C. and 50° C., respectively.

The resin (A) used was a spray-dried powder version of the MQ-type previously described in connection with the Examples. The fluid (A) was an dimethylhydroxy-terminated polydimethylsiloxane gum, having a viscosity of about $5.15 \times 10^6$ cps and sold under the trade mark Dow Corning® SGM 36. The resin (A) was delivered into Zone 1 while the fluid (B) gum was pumped into Zone 2 at a weight ratio of resin (A):fluid (B) of 77:23. The extrudate (i.e. the compression-formed blend of resin (A) and fluid (B)) was cooled in a water trough upon exiting the die and pelletized. The resulting pellets could not be made to agglomerate by hand crushing.

Although the method of preparing solventless, thermoplastic silicone pellets in accordance with the present invention and the silicone pellets of the present invention, and various features and advantages thereof have been described above by way of example, the scope of the present invention is not so limited and should be judged only in accordance with the following claims and equivalents thereof.

What is claimed is:

1. A method of preparing solventless, thermoplastic silicone pellets, which pellets resist agglomeration at temperatures less than a predetermined maximum storage temperature, said method comprising the steps of:

(I) blending:

(A) an organosilicone resin of the empirical formula wherein: a and d are or positive numerical values and b and c are zero or positive numerical values with the provisos that a+b+c+d=1, 0≦(b+c)≦0.2; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl;

said organosilicone resin (A) having a number average molecular weight (Mn) between about 2,000 and about 15,000; and (B) a predominantly linear silicone fluid having the empirical formula wherein: x and y are positive numerical values and z is 0 or a positive numerical value with the provisos that x+y+z=1, y/(x+y+z)≧0.8; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl;

said predominantly linear silicone fluid having a degree of polymerization greater than about 10;

said blending step (I) being carried out to form a substantially homogenous mixture of components (A) and (B);

(II) heating the substantially homogeneous mixture of components (A) and (B) to a predetermined compression-forming temperature;

(III) compression-forming said heated mixture of components (A) and (B) at said compression-forming temperature to form a densified mass therefrom;

(IV) shaping said densified mass into the form of a pellet; and (V) cooling said densified mass to a temperature less than said predetermined maximum storage temperature;

said organosilicone resin (A) and said predominantly linear silicone fluid (B) being present in relative amounts such that: said substantially homogeneous mixture of components (A) and (B) has a complex viscosity ($\eta^*$) less than $10^8$ centipoise at said predetermined compression-forming temperature; and said pellets have a dynamic shear modulus ($G^*$), measured at a frequency of 10 radians/sec, of at least $5 \times 10^7$ dyne/cm$^2$ at temperatures less than said predetermined maximum storage temperature.

2. A method in accordance with claim 1 wherein said predetermine maximum storage temperature is between about 0° C. and 50° C.

3. A method in accordance with claim 2 wherein said predominantly linear silicone (B) has a degree of polymerization in excess of about 100.

4. A method in accordance with claim 2 wherein said predominantly linear silicone (B) is a gum.

5. A method in accordance with claim 2 wherein said predetermined maximum storage temperature is about 25° C. and said organosilicone resin (A) and said predominantly linear silicone fluid (B) are present in relative amounts such that the ratio of the weight of resin (A):fluid (B) is between about 2.3:1 and 4:1.

6. A method in accordance with claim 1 wherein said organosilicone resin (A) and said predominantly linear silicone fluid (B) are present in relative amounts such that said pellets have a dynamic shear modulus ($G^*$), measured at a frequency of 10 radians/sec, of less than $10^9$ dyne/cm$^2$ at said predetermined maximum storage temperature.

7. A method in accordance with claim 1 wherein said predetermined compression-forming temperature is between about 50° C. and 200° C.

8. A method in accordance with claim 1 further comprising: said blending step (I) including the step of dissolving said organosilicone resin (A) and said predominantly linear silicone fluid (B) in a co-solvent; and the additional step of removing said co-solvent from said substantially homogeneous mixture prior to said compression-forming step (III).

9. A method in accordance with claim 8 wherein said co-solvent is an organic aromatic solvent.

10. A method in accordance with claim 8 wherein said co-solvent is hexamethyldisiloxane.

11. A method in accordance with claim 1 wherein said compression-forming step (III) is carried out in a mold.

12. A method in accordance with claim 11 wherein said compression-forming step (III) and said shaping step (IV) are carried out in a mold.

13. A method in accordance with claim 1 wherein said heating step (II) and said compression-forming step (III) are carried out with an extrusion apparatus, said densified mass exiting said apparatus as an extrudate.

14. A method in accordance with claim 13 further comprising: said blending step (I) including the step of dissolving said organosilicone resin (A) and said predominantly linear silicone fluid (B) in a co-solvent; and the additional step of removing said co-solvent from said substantially homogeneous mixture prior to said compression-forming step (III), said co-solvent blending step (I) and said additional co-solvent removing step being carried out in an extrusion apparatus having vacuum ports formed therein.

15. A method in accordance with claim 13 wherein said shaping step (IV) is carried out by a cutting said extrudate with a reciprocating knife blade.

16. A method in accordance with claim 1 wherein said organosilicone resin (A) has a number average molecular weight (Mn) between about 3,000 and about 7,000.

17. A silicone pellet prepared by the method of claim 1.

18. A plurality of solventless, thermoplastic silicone pellets, which pellets resist agglomeration at temperatures less than about 25° C., said pellets having a formulation comprising:

(A) 23 to 40 parts, by weight, of an organosilicone resin of the empirical formula wherein: a and d are or positive numerical values and b and c are zero or positive numerical values With the provisos that a+b+c+d=1, $0 \leq (b+c) \leq 0.2$ and the ratio of a:(b+c+d) is between about 0.3 and 1.0; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same-or different, with the proviso that at least sixty mole percent of said R radicals are methyl;

said organosilicone resin (A) having a number average molecular weight (Mn) between about 2,000 and about 7,000;

(B) about 10 parts, by weight of a predominantly linear silicone fluid having the empirical formula wherein: x and y are positive numerical values and z is 0 or a positive numerical value with the provisos that x+y+z=1, $y/(x+y+z) \geq 0.8$; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl;

said predominantly linear silicone fluid (B) having a degree of polymerization greater than about 10; and said pellets having a dynamic shear modulus ($G^*$), measured at a frequency of 10 radians/sec, of at least $5 \times 10^7$ dyne/cm$^2$ at temperatures less than about 25° C.

19. A plurality of solventless, thermoplastic silicone pellets in accordance with claim 18, said predominantly linear silicone fluid having a degree of polymerization in excess of 100.

20. A plurality of solventless, thermoplastic silicone pellets in accordance with claim 18, said predominantly linear silicone fluid being a gum.

21. A plurality of solventless, thermoplastic silicone pellets, which pellets resist agglomeration at temperatures less than a predetermined storage temperature, said pellets having a formulation comprising:

(A) an organosilicone resin of the empirical formula wherein: a and d are or positive numerical values and b and c are zero or positive numerical values with the provisos that $a+b+c+d=1$, $0 \leq (b+c) \leq 0.2$; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl;

said organosilicone resin (A) having a number average molecular weight (Mn) between about 3,000 and about 7,000; and (B) a predominantly linear silicone fluid having the empirical formula wherein: x and y are positive numerical values and z is 0 or a positive numerical value with the provisos that $x+y+z=1$, $y/(x+y+z) \geq 0.8$; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl;

said predominantly linear silicone fluid having a degree of polymerization greater than about 10;

said organosilicone resin (A) and said predominantly linear silicone fluid (B) being present in relative amounts such that said pellets have a dynamic shear modulus (G*), measured at a frequency of 10 radians/sec, of at least $5 \times 10^7$ dyne/cm$^2$ at temperatures less than said predetermined maximum storage temperature.

22. A plurality of solventless, thermoplastic silicone pellets in accordance with claim 21 wherein said organosilicone resin (A) and said predominantly linear silicone fluid (B) are present in relative amounts such that said pellets have a dynamic shear modulus (G*), measured at a frequency of 10 radians/sec, of less than $10^9$ dyne/cm$^2$ at said predetermined maximum storage temperature.

* * * * *

UNITED STATES PATENT AND TRADEMARK OFFICE
CERTIFICATE OF CORRECTION

PATENT NO. : 5,708,098

DATED : January 13, 1998

INVENTOR(S) : Cook et al.

It is certified that error appears in the above-identified patent and that said Letters Patent is hereby corrected as shown below:

column 6, line 34, "The housing 11" should be --The housing 13--.

column 6, lines 44 to 51, each instance of "conveyors 19" should be --conveyors--.

Signed and Sealed this

Twenty-eighth Day of September, 1999

*Attest:*

Q. TODD DICKINSON

*Attesting Officer*  Acting Commissioner of Patents and Trademarks